United States Patent
Hirose et al.

(10) Patent No.: US 7,840,244 B2
(45) Date of Patent: Nov. 23, 2010

(54) SUPERCONDUCTING CABLE

(75) Inventors: Masayuki Hirose, Osaka (JP); Ryosuke Hata, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 847 days.

(21) Appl. No.: 11/666,484

(22) PCT Filed: Sep. 30, 2005

(86) PCT No.: PCT/JP2005/018082

§ 371 (c)(1),
(2), (4) Date: Apr. 27, 2007

(87) PCT Pub. No.: WO2006/048985

PCT Pub. Date: May 11, 2006

(65) Prior Publication Data

US 2008/0293575 A1  Nov. 27, 2008

(30) Foreign Application Priority Data

Nov. 2, 2004 (JP) ............................. 2004-319794
Mar. 14, 2005 (JP) ............................. 2005-072047

(51) Int. Cl.
*H01B 12/00* (2006.01)
*H01B 12/16* (2006.01)
*H01L 39/24* (2006.01)

(52) U.S. Cl. ................. 505/231; 505/230; 505/430; 505/704; 174/125.1; 174/15.4; 174/15.5

(58) Field of Classification Search ......... 505/230–232, 505/430–433, 866; 174/15.4, 15.5, 125.1
See application file for complete search history.

(56) References Cited

FOREIGN PATENT DOCUMENTS

| JP | 58-147906 A | 9/1983 |
|----|-------------|--------|
| JP | 64-060911 A | 3/1989 |
| JP | 01-140514   | 6/1989 |
| JP | 01-227309 A | 9/1989 |
| JP | 03-188602 A | 8/1991 |

(Continued)

OTHER PUBLICATIONS

Chinese Office Action dated Dec. 18, 2009 from related application No. 200580037448.X.

(Continued)

*Primary Examiner*—Stanley Silverman
*Assistant Examiner*—Kallambella Vijayakumar
(74) *Attorney, Agent, or Firm*—Foley & Lardner LLP (57) ABSTRACT

A superconducting cable enables the cooling of the superconducting conductor with high efficiency and has a sufficient insulating strength. A method of controlling the temperature of the coolants used in the cable is offered. The superconducting cable comprises a heat-insulated pipe that houses a cable core provided with a superconducting conductor made of a superconducting material. The cable core is also provided with a poorly heat-conductive pipe placed at the outer side of the outer circumference of the superconducting conductor. The inside and outside of the poorly heat-conductive pipe are separately filled with different types of coolants having different purposes. The poorly heat-conductive pipe is filled with a conductor-use coolant for cooling the superconducting conductor so as to maintain it at the superconducting state. The heat-insulated pipe is filled with an insulation-use coolant for performing electric insulation of the superconducting conductor.

11 Claims, 2 Drawing Sheets

FOREIGN PATENT DOCUMENTS

| | | | |
|---|---|---|---|
| JP | 05-036312 A | | 2/1993 |
| JP | 05036312 | * | 2/1993 |
| JP | 2001-202837 | | 7/2001 |
| JP | 2003-187651 | | 7/2003 |
| JP | 2003187651 | * | 7/2003 |
| SU | 439874 A | | 4/1975 |

OTHER PUBLICATIONS

English Translation of Chinese Office Action dated Dec. 18, 2009 from related application No. 200580037448.X.

Japanese Patent Office; International search report for PCT/JP2005/018082; Jan. 10, 2005; Japan.

Decision of Grant from the Patent Office of the Russian Federation.

English translation of Decision of Grant from the Patent Office of the Russian Federation.

Office Action dated Jun. 19, 2009 from the Patent Office of the Russian Federation issued in related Russian Application No. 2007120526/09(022359).

* cited by examiner

SUPERCONDUCTING CABLE

TECHNICAL FIELD

The present invention relates to a superconducting cable having a superconducting conductor made of a superconducting material and to a method of controlling the temperature of a coolant used for the superconducting cable. The present invention particularly relates to a superconducting cable that not only enables the cooling of the superconducting conductor with high efficiency but also has a sufficient insulating strength.

BACKGROUND ART

Figure 5:
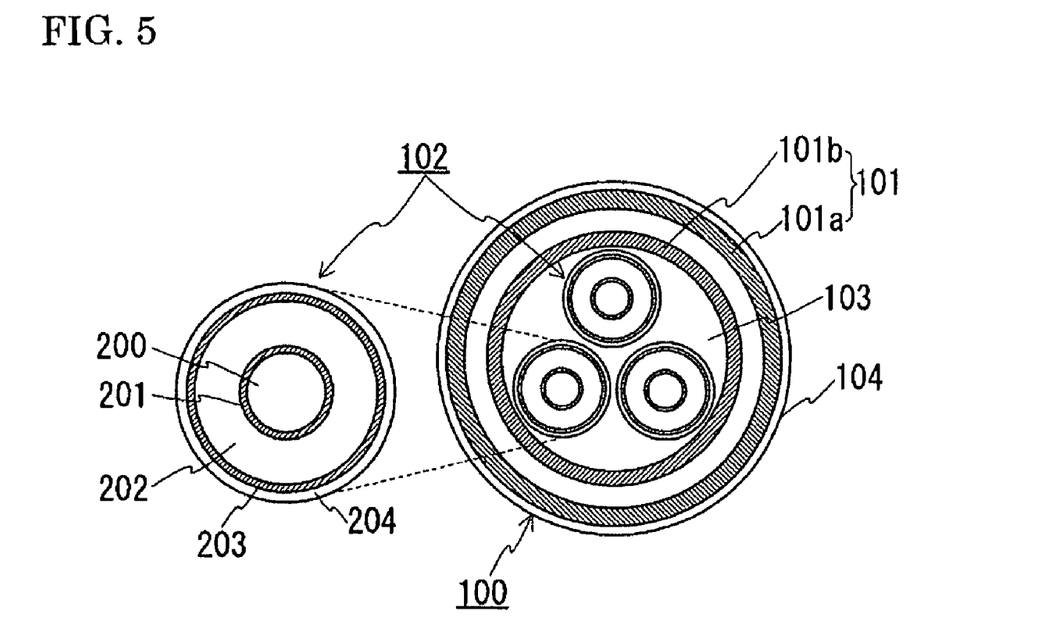
FIG. 5 is a cross-sectional view of a three-core-twisted-type superconducting cable for the three-phase AC use.

As a conventional superconducting cable, a cable has been known that has a structure in which a cable core having a superconducting conductor is housed in a heat-insulated pipe. The examples of the foregoing superconducting cable include (a) a single-core cable that houses one cable core in a heat-insulated pipe and (b) a three-core-twisted-type cable that is formed by twisting three cable cores together and by housing the twisted body in the pipe. FIG. 5 is a cross-sectional view of a three-core-twisted-type superconducting cable for the three-phase AC use. A superconducting cable 100 has a structure in which three cable cores 102 are twisted together and housed in a heat-insulated pipe 101. The heat-insulated pipe 101 has a dual-pipe structure composed of an outer pipe 101$a$ and an inner pipe 101$b$, between which a heat-insulating material (not shown) is placed. The space between the pipes 101$a$ and 101$b$ is evacuated in vacuum. Each of the cable cores 102 comprises, from the center in the following order, a former 200, a superconducting conductor 201, an electrically insulating layer 202, a superconducting shielding layer 203, and a protecting layer 204. A space 103 enclosed by the inner pipe 101$b$ and the cable cores 102 forms a coolant channel. An anticorrosion covering 104 is provided on the outer circumference of the heat-insulated pipe 101.

The superconducting conductor 201 and the superconducting shielding layer 203 of the cable core 102 are cooled by a coolant circulating in the space 103, so that the superconducting state is maintained. As such a coolant, liquid nitrogen is commonly known. Patent literature 1 has described a superconducting cable that (a) uses a hollow former, (b) uses liquid air as the coolant to be circulated in the former, and (c) uses liquid nitrogen as the coolant to be circulated in the heat-insulated pipe.

Patent literature 1: the published Japanese patent application Tokukai 2001-202837.

DISCLOSURE OF THE INVENTION

Problem to be Solved by the Invention

Liquid nitrogen has not only a cooling capability but also a high electric-insulation performance. Consequently, the use of liquid nitrogen as the coolant can achieve the functions of cooling and electric insulation. In addition, when liquid nitrogen is used as the coolant, a sufficient shielding current flows in the superconducting shielding layer, so that a problem of electromagnetic interference (EMI) can be avoided. Therefore, a conventional superconducting cable usually uses liquid nitrogen as the coolant in order to achieve the functions of cooling and electric insulation of the superconducting conductor and to avoid the EMI problem.

In a superconducting cable, as the maintaining temperature of the superconducting conductor is decreased, the critical current is increased, thereby maintaining a good superconducting state. Consequently, in the case where two cables use the same quantity of superconducting material for forming the superconducting conductor, the cable having a coolant whose temperature for cooling the superconducting conductor is lower than that of the other cable has a larger critical current and consequently can transmit a larger electric power. Alternatively, in the case where two cables transmit the same amount of electric power, the cable having a coolant whose temperature for cooling the superconducting conductor is lower than that of the other cable can be produced by using a smaller quantity of superconducting material for forming the superconducting conductor and consequently can use a superconducting conductor having a smaller diameter. It can also be produced by using a smaller quantity of superconducting material for forming the superconducting shielding layer. Therefore, the decreasing of the coolant temperature enables the increase in the transmission power and the decrease in the necessary quantity of superconducting material. Nevertheless, in the conventional superconducting cable using liquid nitrogen as the coolant, when it is intended to decrease the temperature of the liquid nitrogen so that the transmission power can be increased and the diameter of the superconducting conductor can be decreased, it is required to use a cooling apparatus having a high cooling capability to further decrease the temperature of the liquid nitrogen. This intended system has a decreased energy efficiency. Furthermore, when liquid nitrogen is used as the coolant, the attainable low temperature has a limitation.

On the other hand, the superconducting cable described in Patent literature 1 has a structure in which liquid air is used as the coolant to be circulated in the former. This structure can cool the superconducting conductor to a lower temperature than that attained when liquid nitrogen is used as the coolant. However, no study is made on coolants other than the liquid air as the coolant for cooling the superconducting conductor. In addition, Patent literature 1 studies the technique only on the hollow former and does not study the technique on the solid former.

In view of the above circumstances, a main object of the present invention is to offer a superconducting cable that can sufficiently perform the cooling of the superconducting conductor and the electric insulation while increasing the transmission power and decreasing the necessary quantity of the superconducting material. Another object of the present invention is to offer a superconducting cable that can sufficiently perform the cooling of the superconducting conductor and the electric insulation even when the cable uses a solid former. Yet another object is to offer a method of controlling the temperature of a coolant used for the superconducting cable.

Means to Solve the Problem

The present invention attains the foregoing object by separately providing a coolant for cooling the superconducting conductor and a coolant for performing electric insulation of the superconducting conductor, not by using a single type of coolant for performing both the cooling of the superconducting conductor and electric insulation of it. More specifically, a superconducting cable of the present invention has a structure in which a member having a low thermal conductivity is placed between the superconducting conductor and the electrically insulating layer so that the coolant for cooling the conductor and the coolant for electric insulation can be separated by the member. Consequently, the two coolants are separately placed at the inside and outside of the member. In other words, the present invention offers a superconducting cable provided with a heat-insulated pipe that houses a cable core. In the cable, the cable core is provided with:
(a) a superconducting conductor made of a superconducting material;
(b) a poorly heat-conductive pipe placed at the outer side of the outer circumference of the superconducting conductor;
(c) an electrically insulating layer placed on the outer circumference of the poorly heat-conductive pipe; and
(d) an outer superconducting layer that is placed on the outer circumference of the electrically insulating layer and that is made of a superconducting material.

A conductor-use coolant for cooling the superconducting conductor to make it achieve a superconducting state is circulated in the poorly heat-conductive pipe. The heat-insulated pipe is filled with an insulation-use coolant for performing electric insulation of the superconducting conductor. In particular, it is desirable that the conductor-use coolant have a temperature lower than that of the insulation-use coolant. The present invention is explained below in more detail.

A superconducting cable of the present invention is provided with a cable core housed in a heat-insulated pipe. The cable core is specified to have a superconducting conductor, a poorly heat-conductive pipe, an electrically insulating layer, and an outer superconducting layer. The cable core is housed in the heat-insulated pipe such that a space is provided between the outer circumferential surface of the core and the inner circumferential surface of the heat-insulated pipe. The cable core to be housed in the heat-insulated pipe may either be one core (a single core) or a plurality of cores (multiple cores). More specifically, for example, in the case where a superconducting cable of the present invention is used for three-phase AC transmission, it is recommendable to twist together three cores so as to be housed in the heat-insulated pipe. When it is used for single-phase AC transmission, it is recommendable to house one core in the heat-insulated pipe. When a superconducting cable of the present invention is used for DC transmission with a unipolar transmission system, it is recommendable to house one core in the heat-insulated pipe, for example. When it is used for DC transmission with a bipolar transmission system, it is recommendable to twist together two or three cores so as to be housed in the heat-insulated pipe. As described above, a superconducting cable of the present invention can be used for both DC transmission and AC transmission.

The superconducting conductor provided in the cable core is formed by using a superconducting material. The types of the superconducting material include, for example, a Bi-based oxide material, more specifically a Bi-2223-containing oxide material. The superconducting conductor may be formed, for example, in the shape of a layer by helically winding, on a former, tape-shaped wires having a structure in which a plurality of filaments made of the above-described oxide superconducting material are placed in a matrix such as a silver sheath. The winded layer may either be a single layer or multiple layers. When a multilayer structure is employed, an insulating layer may be provided between the superconducting layers. The insulating layer between the superconducting layers may be formed, for example, by helically lapping insulating paper, such as kraft paper, or semisynthetic insulating paper, such as PPLP (registered trademark, produced by Sumitomo Electric Industries, Ltd.) (PPLP is the abbreviation of polypropylene-laminated paper). The former functions as a member for maintaining the shape of the superconducting conductor. The former may either be a solid body or be a hollow body formed by using a metallic material such as copper or aluminum. As a former formed with a hollow body, a spiral steel tape or a metallic pipe may be used, for example. The metallic pipe may either be a smooth pipe having a smooth surface or be a corrugated pipe having alternating ridges and grooves on the surface. When a corrugated pipe is used as the former, it has a desirable property such as excellent flexibility. When a hollow former is used, the below-described conductor-use coolant fills at least the inside of the former to cool the superconducting conductor. As a solid former, the former may have a structure in which, for example, a plurality of metallic wires, such as copper wires, are stranded. As the metallic wires, such as copper wires, wires each having an insulating coating may be used. When a former having an unevenness on the surface, such as a corrugated pipe or a stranded metallic-wire structure, is used, it may be difficult to helically wind the wires made of a superconducting material. Furthermore, because both the superconducting wires and the former are formed with metal, when the two members are brought into direct contact, the damaging of the superconducting wires and another problem may be created. To avoid such problems, a cushion layer for obtaining a smooth surface may be provided by helically lapping kraft paper or carbon paper on the surface of the former.

The poorly heat-conductive pipe is placed at the outer side of the outer circumference of the above-described superconducting conductor to allow a conductor-use coolant (to be described below) for cooling the superconducting conductor to circulate through the inside of the poorly heat-conductive pipe. The space at the outside of the poorly heat-conductive pipe (i.e., at the inside of the heat-insulated pipe (to be described below)) is filled with an insulation-use coolant (to be described below) for performing electric insulation of the superconducting conductor. In other words, the poorly heat-conductive pipe functions as a member for separating the conductor-use coolant and the insulation-use coolant from each other. The poorly heat-conductive pipe prevents both coolants from mixing with each other by passing through the place (at which the pipe is intended to be placed) from inside to outside, and vice versa. The poorly heat-conductive pipe may be provided directly on the superconducting conductor so as to make contact with the superconducting conductor. Alternatively, a poorly heat-conductive pipe having an inner diameter larger than the outer diameter of the superconducting conductor may also be used. In this case, the superconducting conductor is inserted into the pipe such that a clearance is provided between the inner circumferential surface of the pipe and the outer circumferential surface of the superconducting conductor. When the poorly heat-conductive pipe is formed directly on the superconducting conductor, the former is formed with a hollow body. The former is filled with the below-described conductor-use coolant to cool the superconducting conductor. In this case, the structure is such that although the conductor-use coolant is circulated at the inside of the poorly heat-conductive pipe, the pipe itself does not make contact with the conductor-use coolant. On the other hand, in the case where the poorly heat-conductive pipe is formed such that a clearance is provided between the pipe and the superconducting conductor as described above, the former may either be a solid body or be a hollow body. For the solid body, the clearance is filled with the conductor-use coolant. In other words, the poorly heat-conductive pipe is filled with the conductor-use coolant. In this case, the structure is such that the poorly heat-conductive pipe itself makes contact with the conductor-use coolant. In the case of the hollow body, the conductor-use coolant may fill either (a) both the former and the clearance between the poorly heat-conductive pipe and the superconducting conductor or (b) the former only. In the latter case, the above-described clearance may be maintained at a vacuum state with a low vacuum degree so that the heat at the outside of the poorly heat-conductive pipe can be transferred to the conductor-use coolant in the former to a certain extent to cool the insulation-use coolant. Alternatively, the clearance may be filled with a fluid that is different from the conductor-use coolant and that is cooled to a degree comparable to the conductor-use coolant.

The above-described poorly heat-conductive pipe is specified to have a low heat-conducting ability. Although specified to have a low heat-conducting ability, the pipe is specifically required to have a heat-insulating performance to such an extent that the performance is lower than that of the heat-insulated pipe that houses the cable core. If the poorly heat-conductive pipe has an excessively high heat-conducting ability, i.e., if it excessively transfers the heat, when the conductor-use coolant circulating in it has a temperature lower than that of the insulation-use coolant, the insulation-use coolant lying at the outside of the poorly heat-conductive pipe is cooled by the conductor-use coolant. In this case, the insulation-use coolant may be solidified. When it is excessively solidified, the circulation of the insulation-use coolant may be affected undesirably. On the contrary, in the case where a liquid having a temperature lower than that of the insulation-use coolant is used as the conductor-use coolant, the conductor-use coolant may be warmed by the insulation-use coolant to be gasified. This gasification may excessively increase the volume of the conductor-use coolant, which is undesirable. Consequently, the heat-conducting ability of the poorly heat-conductive pipe is specified to be high to such an extent that the heat-conducting ability does not create problems in the operation of the cable by eliminating the excessive gasification of the conductor-use coolant or the excessive solidification of the insulation-use coolant. A cable of the present invention is provided with a poorly heat-conductive pipe having the foregoing heat-conducting ability. Consequently, the cable can form a temperature gradient in which the temperature relatively gradually rises from the inside of the poorly heat-conductive pipe to the outside of the pipe in the region between the inside and outside of the pipe. Therefore, a heat loss in the insulation-use coolant can be compensated by the conductor-use coolant. In other words, even when the temperature of the insulation-use coolant rises due to the intruding heat, the temperature rise in the insulation-use coolant can be decreased by the cooling of the conductor-use coolant.

Such a poorly heat-conductive pipe may be prepared, for example, by using a heat-insulated structural pipe having a decreased heat-insulating performance or by forming the shape of a pipe using a material having a low thermal conductivity. To decrease the heat-insulating performance, for example, first, a poorly heat-conductive pipe may be formed with a dual-pipe structure having an inner pipe and outer pipe. Then, any of the following methods may be employed to treat the space between the two pipes, for example:

(a) evacuating the space with a decreased quantity of a heat-insulating material being placed in the space,
(b) evacuating the space without using a heat-insulating material at all, and
(c) evacuating the space with a low vacuum degree without using a heat-insulating material at all.

The types of the material having a low thermal conductivity include resin, which is known for its thermal conductivity lower than that of metal (metal is generally known for its high thermal conductivity). The specific types of the resin include fluororesin, such as Teflon (registered trademark), and fiber-reinforced plastic (FRP). The above-described material may be processed to form the shape of a hollow pipe (tube), so that the superconducting conductor formed on a former is inserted into it. Alternatively, the foregoing resinous material may be extruded directly on the superconducting conductor to cover it, so that a poorly heat-conductive pipe is formed. In addition, the poorly heat-conductive pipe may have a structure in which a metallic pipe and resinous pipe are combined.

The electrically insulating layer is provided on the poorly heat-conductive pipe. The electrically insulating layer may be formed, for example, by helically lapping semisynthetic insulating paper, such as PPLP (registered trademark), or insulating paper, such as kraft paper, directly on the poorly heat-conductive pipe. It is desirable to provide an electrode portion, which is to be given the conductor potential, directly on the poorly heat-conductive pipe. When the electrode portion is provided, the electrically insulating layer is provided on the electrode portion. The electrode portion may be formed, for example, with a conducting material such as copper. A semiconducting layer may be formed at the inner circumference, the outer circumference, or both of the electrically insulating layer. More specifically, it may be formed between the poorly heat-conductive pipe (or the electrode portion) and the electrically insulating layer, between the electrically insulating layer and the outer superconducting layer (to be described below), or both. When the inner semiconducting layer, which is the former, or the outer semiconducting layer, which is the latter, is formed, the poorly heat-conductive pipe or the outer superconducting layer is brought into increased contact with the electrically insulating layer. As a result, the deterioration accompanying the generation of partial discharge or the like will be suppressed. The semiconducting layer may be formed, for example, by using carbon paper.

When a superconducting cable of the present invention is used for DC transmission, the above-described electrically insulating layer may be structured with a $\rho$ (resistivity) grading to flatten the radial (thicknesswise) distribution of the DC electric field. The $\rho$ grading is performed such that as the radial position moves toward the innermost portion of the electrically insulating layer, the resistivity decreases, and as the radial position moves toward the outermost portion, the resistivity increases. The performing of the $\rho$ grading varies the resistivity of the electrically insulating layer thicknesswise in steps. This $\rho$ grading can flatten the thicknesswise distribution of the DC electric field throughout the electrically insulating layer. As a result, the thickness of the electrically insulating layer can be decreased. The number of layers each having a different resistivity is not particularly limited. Practically, however, two or three layers or so are employed. In particular, when the thicknesses of the individual layers are equalized, the flattening of the distribution of the DC electric field can be more effectively performed.

To perform the $\rho$ grading, it is recommendable to use insulating materials having different resistivities ($\rho$'s). For example, when insulating paper, such as kraft paper, is used, the resistivity can be varied, for example, by varying the density of the kraft paper or by adding dicyandiamide to the kraft paper. When composite paper, such as PPLP (registered trademark), composed of insulating paper and plastic film is used, the resistivity can be varied either by varying the ratio, k, of the thickness, tp, of the plastic film to the total thickness, T, of the composite paper (the ratio, k, is expressed as (tp/T)× 100) or by varying the density, quality, additive, or the like of the insulating paper. It is desirable that the value of the ratio, k, lie in a range of 40% to 90% or so, for example. Usually, as the ratio, k, increases, the resistivity, $\rho$, increases.

In addition, when the electrically insulating layer has, in the vicinity of the superconducting conductor layer, a high $\in$ (dielectric constant) layer that has a dielectric constant higher than that of the other portion, not only can the DC voltage-withstanding property be improved but also the impulse voltage-withstanding property can be improved. The values of dielectric constant, $\in$, (at 20° C.) are summarized below:

(a) ordinary kraft paper: 3.2 to 4.5 or so
(b) composite paper with a ratio, k, of 40%: 2.8 or so
(c) composite paper with a ratio, k, of 60%: 2.6 or so
(d) composite paper with a ratio, k, of 80%: 2.4 or so.

In particular, it is desirable to form the electrically insulating layer by using composite paper that has a high ratio, k, and that incorporates kraft paper having a rather high air impermeability, because this structure is excellent in both DC and impulse withstand voltages.

In addition to the above-described ρ grading, when the electrically insulating layer is structured such that as its radial position moves toward the innermost portion, the dielectric constant, $\in$, increases, and as the radial position moves toward the outermost portion, the dielectric constant, $\in$, decreases, the cable also becomes suitable for AC transmission. This $\in$ grading, also, is formed radially throughout the electrically insulating layer. As described above, by the performing of the ρ grading, a superconducting cable of the present invention becomes a cable having excellent DC property, rendering itself suitable for DC transmission. On the other hand, at present, most of the transmission lines are structured as AC systems. In view of the future transition of transmission systems from AC to DC, it can be considered that before the transition to the DC transmission, there exists a case where the AC transmission is carried out by transiently using a cable of the present invention. For example, there will be a case in which although part of the cable in a trans-mission line is replaced with a superconducting cable of the present invention, the remaining portion is still composed of an AC transmission cable. Another case is conceivable in which although the AC transmission cable in a trans-mission line is replaced with a superconducting cable of the present invention, the power-transmitting apparatuses connected to the cable still remain for the AC use. In this case, first, AC transmission is transiently performed using the cable of the present invention, and then, finally, the transition to DC trans-mission will be performed. Therefore, it is desirable that a cable of the present invention not only have an excellent DC property but also be designed by considering the AC property. When the AC property, also, is taken into consideration, a cable having an excellent property against impulse voltage, such as surge voltage, can be structured by employing an electrically insulating layer that increases its dielectric constant, $\in$, as its radial position moves toward the innermost portion and decreases its dielectric constant, $\in$, as its radial position moves toward the outermost portion. At a later time, when the foregoing transient period is finished to commence the DC transmission, the cable of the present invention used in the transient period can be used as the DC cable without any modification. In other words, a cable of the present invention structured not only by the ρ grading but also by the $\in$ grading can be suitably used not only for DC transmission and for AC transmission individually but also as an AC/DC cable.

Usually, the above-described PPLP (registered trademark) has a property such that when the ratio, k, is increased, the resistivity, ρ, is increased and the dielectric constant, $\in$, is decreased. Consequently, when the electrically insulating layer is structured in such a way that as the radial position moves toward the outermost portion, PPLP (registered trademark) having a higher ratio, k, is used, the electrically insulating layer can have a property such that as the radial position moves toward the outermost portion, the resistivity, ρ, is increased and concurrently the dielectric constant, $\in$, is decreased.

On the other hand, kraft paper generally has a property such that when the air impermeability is increased, the resistivity, ρ, is increased and the dielectric constant, $\in$, is also increased. Consequently, when only kraft paper is used, it is difficult to structure the electrically insulating layer in such a way that as the radial position moves toward the outermost portion, the resistivity, ρ, is increased and concurrently the dielectric constant, $\in$, is decreased. Consequently, when kraft paper is used, it is desirable that the electrically insulating layer be structured by combining with composite paper. For example, it is recommended that a kraft-paper layer be formed at the innermost portion of the electrically insulating layer and that a PPLP layer be formed at the outer side of the kraft-paper layer. In this case, the PPLP layer has a resistivity, ρ, higher than that of the kraft-paper layer, and at the same time, the PPLP layer has a dielectric constant, $\in$, lower than that of the kraft-paper layer.

The outer superconducting layer is provided on the above-described electrically insulating layer (or on the outer semi-conducting layer). The outer superconducting layer functions as a shielding layer that allows a current (shielding current) having nearly the same magnitude as that of the current flowing in the superconducting conductor to flow in the opposite direction to prevent the electromagnetic interference. The magnetic field produced by the current flowing in the outer superconducting layer cancels out the magnetic field produced by the current flowing in the superconducting conductor, so that the electromagnetic interference can be avoided. When a superconducting cable of the present invention is used for DC transmission, the outer superconducting layer may be used as a return conductor (in the case of uipolar transmission) or as a neutral-line layer (in the case of bipolar transmission). In particular, in the case where bipolar transmission is performed, when an imbalance occurs between the positive and negative poles, the outer superconducting layer can be used to circulate the imbalanced current. In addition, when the bipolar transmission is switched to the unipolar transmission due to an abnormal condition in one pole, the outer superconducting layer can be used as a return conductor through which a current will flow that is comparable to the trans-mission current flowing in the superconducting conductor. The above-described outer superconducting layer is formed with a superconducting material. The outer superconducting layer may be formed by using a superconducting material similar to that used for the superconducting conductor and by helically winding superconducting wires as with the superconducting conductor. A protecting layer combining a function of electric insulation may be provided on the outer superconducting layer. The protecting layer may be formed, for example, by helically lapping kraft paper or another material directly on the outer superconducting layer.

The cable core having the above-described structure is housed in the heat-insulated pipe. The space formed in the heat-insulated pipe, i.e., the space enclosed by the inner circumferential surface and the outer circumferential surface of the core is filled with the below-described insulation-use coolant. The insulation-use coolant having filled the heat-insulated pipe immerses the protecting layer, outer superconducting layer, and electrically insulating layer in it in this order. Thus, the insulation-use coolant, while cooling the outer superconducting layer to maintain the superconducting state of it, performs electric insulation of the superconducting conductor together with the electrically insulating layer. Consequently, a superconducting cable of the present invention achieves sufficient electric insulation by using the electrically insulating layer and the insulation-use coolant. In addition, when a cable of the present invention is used for AC transmission, the outer superconducting layer sufficiently circulates a shielding current induced by the current flowing in the superconducting conductor, so that the electromagnetic interference can be decreased or avoided. Furthermore, when a cable of the present invention is used for unipolar transmission in DC transmission, the outer superconducting layer can be used as the return conductor. In this case, the outer superconducting layer can also function as a shield to decrease or avoid the electromagnetic interference. In the case where a cable of the present invention is used for bipolar transmission in DC transmission, when the core to be used for the positive-pole transmission and the core to be used for the negative-pole transmission are placed in the proximity of each other in such a way that the two cores are housed in the same heat-insulated pipe, the magnetic fields produced by the two cores can be canceled out with each other, so that almost no magnetic field leaks to the outside of the cable.

The above-described heat-insulated pipe is intended to suppress the insulation-use coolant filling the pipe from raising its temperature due to the heat intruding into the inside of the pipe from the outside. Consequently, unlike the foregoing poorly heat-conductive pipe, the heat-insulated pipe is specified to have a structure with high heat-insulating performance. For example, the heat-insulated pipe may have a structure in which a dual-pipe structure is composed of an outer pipe and an inner pipe and the space between the two pipes is not only provided with a heat-insulating material but also evacuated with a high vacuum degree. When this design is employed, the inner pipe is filled with the insulation-use coolant. It is desirable that the above-described heat-insulated pipe be formed by using a corrugated pipe having flexibility. In particular, it is desirable that the heat-insulated pipe be formed with a metallic material such as stainless steel, which has excellent strength.

The present invention has the utmost feature in that a conductor-use coolant is used to cool the superconducting conductor and an insulation-use coolant, which is different from the foregoing conductor-use coolant, is used to electrically insulate the superconducting conductor. The conductor-use coolant is required only to have a cooling capability of maintaining the superconducting conductor at the superconducting state. Nevertheless, in particular, a conductor-use coolant having a lower temperature either can maintain the superconducting state of the superconducting conductor in good condition, thereby enabling the transmission of a larger electric power, or can decrease the quantity of the superconducting material for forming the superconducting conductor, thereby enabling the reduction in the size of the conductor. Therefore, it is desirable to use a conductor-use coolant having a lower temperature. In particular, it is suitable to use a coolant having a temperature lower than that of the insulation-use coolant. On the other hand, the cable uses an insulation-use coolant having not only a sufficient insulating performance for electrically insulating the superconducting conductor but also a sufficient cooling capability to cool the outer superconducting layer so that it can maintain the superconducting state.

The conductor-use coolant may also be the same type of coolant as that of the insulation-use coolant providing that it has a temperature lower than that of the insulation-use coolant. For example, when liquid nitrogen, which is excellent in electrically insulating strength, is used as the insulation-use coolant, the following design may be employed:

(a) as the insulation-use coolant, liquid nitrogen is used that has a temperature of 75 to 77 K or so, which is in the vicinity of the boiling point of it, and
(b) as the conductor-use coolant, liquid nitrogen is used that has a temperature lower than that of the insulation-use coolant; for example, the liquid nitrogen has a temperature of 63 to 65 K or so, which is in the vicinity of the melting point of it.

The conductor-use coolant and the insulation-use coolant may be different from each other in type of coolant. For example, when liquid nitrogen is used as the insulation-use coolant, a fluid that is other than liquid nitrogen and that has a lower temperature may be used as the conductor-use coolant. The types of the foregoing fluid having a lower temperature include:

(a) liquid helium, (b) liquid hydrogen, (c) liquid air, (d) liquid neon,
(e) liquid oxygen having a temperature lower than that of the liquid nitrogen,
(f) helium gas having a temperature lower than that of the liquid nitrogen,
(g) hydrogen gas having a temperature lower than that of the liquid nitrogen, and
(h) a mixed fluid of liquid hydrogen and hydrogen gas, the mixed fluid having a temperature lower than that of the liquid nitrogen.

When a liquid is used as the conductor-use coolant, the liquid may gasify due to the heat generation of the current-carrying superconducting conductor. When the liquid gasifies, if the volume expansion is noticeable, the superconducting conductor may be disrupted in the worst case. Consequently, to pre-vent such a trouble, either a gas cooled to a low temperature in advance or a liquid mixed with a gas may be used. Alternatively, the conductor-use coolant may be maintained to a temperature that does not cause the above-described gasification.

When liquid hydrogen, hydrogen gas, or a mixed fluid of these is used as the conductor-use coolant, it is desirable that a superconducting cable of the present invention be used to supply electric power to various power apparatuses used in a hydrogen station that stores compressed hydrogen or liquid hydrogen and a hydrogen plant that produces liquid hydrogen, because the conductor-use coolant can be obtained from a hydrogen-storing tank provided in the foregoing station and plant. These station and plant are equipped with a cooling apparatus to maintain the stored liquid hydrogen at a proper temperature and carry out the temperature control properly. Consequently, when a cable line incorporating a superconducting cable of the present invention using the foregoing liquid hydrogen or the like as the conductor-use coolant is constructed at the above-described hydrogen station or hydrogen plant, it is not necessary to separately provide a cooling apparatus for the conductor-use coolant. The cooling apparatus provided in these stations can also be used as the cooling apparatus for the conductor-use coolant. Alternatively, only the providing of a temperature-controlling device for performing the fine control of the temperature of the conductor-use coolant enables the maintaining of the hydrogen gas, liquid hydrogen, or a mixed fluid of these used as the conductor-use coolant at a specified temperature. Therefore, the superconducting cable of the present invention having this structure can further increase the energy efficiency.

As described above, the conductor-use coolant has a temperature lower than that of the insulation-use coolant and fills the poorly heat-conductive pipe (or a former placed in the poorly heat-conductive pipe) having a heat-conducting ability to such an extent that the insulation-use coolant can be cooled to a certain extent. The forming of this structure enables the cooling of the insulation-use coolant lying at the outside of the poorly heat-conductive pipe. In other words, the conductor-use coolant can also be used as a member for cooling the insulation-use coolant. Consequently, the degree of the cooling of the insulation-use coolant can be controlled through the following ways:

(a) the controlling of the temperature of the conductor-use coolant, (b) the controlling of the circulating condition of the conductor-use coolant, and (c) the controlling of the heat-conducting property of the poorly heat-conductive pipe by controlling its material property and heat-insulating performance.

Thus, the temperature of the insulation-use coolant can be maintained at a nearly constant value. As described above, when the temperature of the insulation-use coolant is controlled by utilizing (a) the temperature and circulating condition of the conductor-use coolant and (b) the material property and heat-insulating performance of the poorly heat-conductive pipe, the insulation-use coolant can be cooled to a specified temperature either without using a cooling apparatus or using a cooling apparatus having a low cooling capability. When the temperature variation in the insulation-use coolant is small, it is required only to provide a temperature-controlling mechanism that has a capability to such an extent that the flow rate and temperature of the insulation-use coolant can be controlled only by a small amount. When a superconducting-cable line is constructed, the line is properly provided with a refrigerator for cooling the coolant and a pump for pressure-feeding the coolant. These apparatuses determine the length of the circulating channel (cooling section) so that the coolant can be circulated at a proper temperature. As described above, the temperature control of the insulation-use coolant can be performed with a simplified apparatus, rather than a large-scale apparatus. Therefore, when a cable line is constructed by using a superconducting cable of the present invention, not only can the length of one cooling section be increased but also the apparatus can be simplified.

It is recommended that the heat-conducting ability and heat-insulating performance of the material for the poorly heat-conductive pipe be varied properly according to the conductor-use coolant and insulation-use coolant employed. The heat-conducting ability can be varied by varying not only the material but also the thickness of the poorly heat-conductive pipe. The heat-insulating performance can be varied, as described above, by varying the quantity of the heat-insulating material used and the vacuum degree. The control of the circulating condition for the conductor-use coolant may be performed, for example, by controlling the circulating time duration and circulating quantity. For example, when the insulation-use coolant can be cooled sufficiently by circulating the conductor-use coolant on an as needed basis, the insulation-use coolant may either be uncirculated or be circulated. When the circulation of the conductor-use coolant on an as needed basis cools the insulation-use coolant excessively, the flow rate of the conductor-use coolant may be controlled by decreasing it or by another way. Alternatively, the circulation and noncirculation may be repeated, rather than circulating on an as needed basis. In the above two cases, it is not necessary to circulate the insulation-use coolant. When the insulation-use coolant is cooled by the conductor-use coolant, the insulation-use coolant may be solidified at part of it, particularly at the portion where the insulation-use coolant makes contact with the poorly heat-conductive pipe.

The present invention permits the solidification of the insulation-use coolant providing that the insulation-use coolant both can have a sufficient insulating performance for electrically insulating the superconducting conductor and can be circulated to such an extent that the circulation creates no problem in the operation.

In addition, the value of the critical current can be increased by further decreasing the temperature of the conductor-use coolant. Consequently, even when a high current flows in the superconducting conductor at the time of an accident such as short circuiting, no problem is created such as the disruption of the superconducting conductor. Alternatively, the above-described problem can be prevented by increasing the flow rate (which is possible) of the conductor-use coolant to speedily cool the superconducting conductor to a specified temperature.

The above-described superconducting cable of the present invention is suitable for the use as a cable for supplying electric power to various power apparatuses and consumers, for example. In particular, when a superconducting cable of the present invention is used to supply electric power to various power apparatuses provided in a plant or station for a fluid such as liquid hydrogen as described above, the fluid in the plant or the like can be used as the conductor-use coolant. In such a case, when the cable line is constructed, it is not required to separately provide a cooling apparatus for the conductor-use coolant. Therefore, a superconducting cable of the present invention can offer a cable line having excellent energy efficiency.

A superconducting cable of the present invention can be used not only for DC transmission but also for AC transmission. When three-phase AC trans-mission is performed, it is recommended that a cable of the present invention be formed as a three-core cable having a structure in which three cable cores described above are twisted together and housed in the heat-insulated pipe. In this case, it is recommended that the superconducting conductors of the individual cores be used for the transmission for the individual phases and that the outer superconducting layers of the individual cores be used as the shielding layers. When single-phase AC transmission is performed, it is recommended that a cable of the present invention be formed as a single-core cable having a structure in which one cable core described above is housed in the heat-insulated pipe. In this case, it is recommended that the superconducting conductor of the core be used for the transmission for the phase and that the outer superconducting layer be used as the shielding layer. When unipolar DC transmission is performed, it is recommended that a cable of the present invention be formed as a single-core cable having a structure in which one cable core described above is housed in the heat-insulated pipe. In this case, it is recommended that the superconducting conductor of the core be used as the outward conductor and the outer superconducting layer as the return conductor. When bipolar DC transmission is performed, it is recommended that a cable of the present invention be formed as a two-core cable having a structure in which two cable cores described above are housed in the heat-insulated pipe. In this case, it is recommended that the superconducting conductor of one core be used for the positive-pole transmission, the superconducting conductor of the other core be used for the negative-pole transmission, and the outer superconducting layers of both cores be used as the neutral-line layers.

Effect of the Invention

A superconducting cable of the present invention having the above-described structure achieves the following excellent effects:

(a) the cable maintains the superconducting state of the superconducting conductor in good condition, (b) consequently, the cable can increase the transmission power or decrease the diameter of the superconducting conductor, and (c) the cable can sufficiently perform the electric insulation.

In addition, even when the diameter of the superconducting conductor is decreased, the superconducting cable of the present invention can sufficiently secure the circulating channel for the conductor-use coolant. Furthermore, when a cable line is constructed using the superconducting cable of the present invention, by controlling the temperature of the insulation-use coolant by utilizing the conductor-use coolant, either the need for the cooling apparatus for the insulation-use coolant can be eliminated or the insulation-use coolant can be maintained at a specified temperature only by providing a simple temperature-controlling mechanism. Moreover, when the superconducting cable of the present invention is used for the supply of electric power in a hydrogen plant or hydrogen station and liquid nitrogen or a low-temperature hydrogen gas is used as the conductor-use coolant, the conductor-use coolant can be cooled by using the apparatus provided in the plant or the like. Consequently, the necessity for providing the separate cooling apparatus for the conductor-use coolant can be eliminated.

In the core provided in a superconducting cable of the present invention, by performing the ρ grading in the electrically insulating layer, the thicknesswise distribution of the DC electric field can be flattened throughout the electrically insulating layer. As a result, the DC voltage-withstanding property is improved, and consequently the thickness of the electrically insulating layer can be decreased. In addition to the ρ grading, by providing an electrically insulating layer having high $\in$ in the vicinity of the superconducting conductor, the impulse voltage-withstanding property can also be improved in addition to the above-described improvement in the DC voltage-withstanding property. In particular, by structuring the electrically insulating layer in such a way that as its radial position moves toward the innermost portion, the $\in$ increases, and as the radial position moves toward the outermost portion, the $\in$ decreases, a superconducting cable of the present invention can be a cable also having an excellent AC electric property. Therefore, a superconducting cable of the present invention can not only be suitably used for both of the DC transmission and AC transmission but also be suitably used during a transient period in which the transmission system is switched between AC and DC.

EXPLANATION OF THE SIGN

1: Superconducting conductor; 2A, 2C, and 2D: Poorly heat-conductive pipe; 2D$_i$: Inner pipe; 2D$_o$: Outer pipe; 3A, 3B, and 3C: Former; 4: Electrically insulating layer; 5: Outer superconducting layer; 6: Protecting layer; 10, 20, 30, and 40: Cable core; 11: Conductor-use coolant; 12: Insulation-use coolant; 15: Heat-insulated pipe; 15a: Outer pipe; 15b: Inner pipe; 16: Anticorrosion covering; 100: Superconducting cable for three-phase AC use; 101: Heat-insulated pipe; 101a: Outer pipe; 101b: Inner pipe; 102: Cable core; 103: Space; 104: Anticorrosion covering; 200: Former; 201: Superconducting conductor; 202: Electrically insulating layer; 203: Superconducting shielding layer; 204: Protecting layer.

BEST MODE FOR CARRYING OUT THE INVENTION

Embodiments of the present invention are explained below.

Example 1

Figure 1:
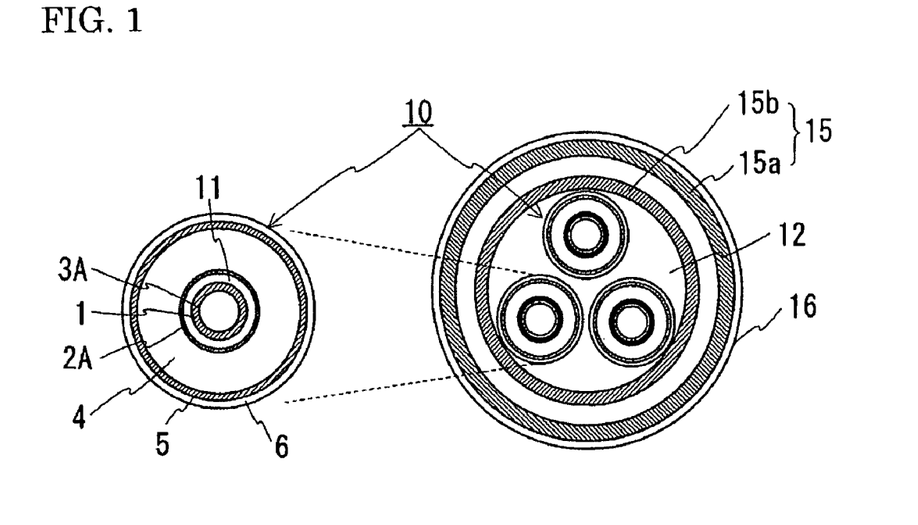
FIG. 1 is a schematic cross-sectional view of a superconducting cable of the present invention, the view showing an example in which the former is a solid body.

FIG. 1 is a schematic cross-sectional view of a superconducting cable of the present invention. In the following drawing, the same sign represents the same item. In addition, the ratio of the dimensions in the drawing does not necessarily coincide with that used in the explanation. A superconducting cable of the present invention has a structure in which cable cores 10, each of which has a superconducting conductor 1 made of a superconducting material, are housed in a heat-insulated pipe 15. The cable core 10 has a poorly heat-conductive pipe 2A at the outer side of the outer circumference of the superconducting conductor 1. The poorly heat-conductive pipe 2A is filled with a conductor-use coolant 11 for cooling the superconducting conductor 1 to maintain it at the superconducting state. The heat-insulated pipe 15 is filled with an insulation-use coolant 12 for performing electric insulation of the superconducting conductor 1. In other words, this superconducting cable has a structure in which two types of coolants having different purposes are separately provided at the inside and outside of the poorly heat-conductive pipe 2A; i.e., the pipe 2A separates the two coolants.

The superconducting cable used in this example has a structure in which the three cores 10 are twisted together and housed in a heat-insulated pipe 15. Each of the cable cores 10 has the same basic structure as that of the conventional superconducting cable shown in FIG. 5, except that the poorly heat-conductive pipe 2A is provided at the outer side of the outer circumference of the superconducting conductor 1 (between the superconducting conductor 1 and an electrically insulating layer 4). More specifically, the cable core 10 is provided with a former 3A, the superconducting conductor 1, the poorly heat-conductive pipe 2A, the electrically insulating layer 4, an outer superconducting layer 5, and a protecting layer 6 in this order from the center. Although this example employs three cores, a single core or two cores may be employed. This matter is applicable to the following examples. Although not shown in FIG. 1, an electrode portion having the conductor potential is provided directly on the poorly heat-conductive pipe 2A.

The superconducting conductor 1 and the outer superconducting layer 5 were formed by using superconducting tape-shaped wires made of a Bi-2223-based oxide (Ag—Mn-sheathed tape-shaped wires). The superconducting conductor 1 was structured by helically winding the foregoing superconducting tape-shaped wires on the former 3A. The outer superconducting layer 5 was structured by the same method as above on the electrically insulating layer 5. The former 3A was a solid body formed by stranding a plurality of copper wires. A cushion layer (not shown) made of insulating paper was formed between the former 3A and the superconducting conductor 1. The electrically insulating layer 4 was structured on the poorly heat-conductive pipe 2A by helically lapping semisynthetic insulating paper (PPLP: registered trademark, produced by Sumitomo Electric Industries, Ltd.). An inner semiconducting layer may be provided at the inner-circumference side of the electrically insulating layer 4 (i.e., on the electrode portion). An outer semiconducting layer may be provided at the outer-circumference side of the electrically insulating layer 4 (i.e., under the outer superconducting layer 5). The protecting layer 6 was provided on the outer superconducting layer 5 by helically lapping insulating paper. Three cable cores 10 described above were prepared, were twisted together with a slack so as to have an allowance for contraction needed for thermal contraction, and were housed in the heat-insulated pipe 15.

The poorly heat-conductive pipe 2A placed at the outer side of the outer circumference of the superconducting conductor 1 is an FRP pipe. Its inner diameter is larger than the outer diameter of the superconducting conductor 1. Consequently, when the superconducting conductor 1 provided on the former 3A is inserted into the poorly heat-conductive pipe 2A, a clearance is provided between the inner circumferential surface of the pipe 2A and the outer circumferential surface of the superconducting conductor 1. The clearance in the poorly heat-conductive pipe 2A is filled with the conductor-use coolant 11 to cool the superconducting conductor 1. In this example, liquid nitrogen (operating temperature: about 20 K) is used as the conductor-use coolant 11. The conductor-use coolant 11 is required only to have a temperature lower than that of the insulation-use coolant 12. For example, hydrogen gas cooled to 20 to 50 K or so or a mixed fluid of the hydrogen gas and liquid nitrogen may be used. The poorly heat-conductive pipe 2A has a heat-conducting ability that allows the heat conduction (heat intrusion) from the outside of the pipe 2A to the inside of it to a certain extent. The poorly heat-conductive pipe 2A also has a function to separate the conductor-use coolant 11 and the insulation-use coolant 12 so that the two coolants 11 and 12 cannot be mixed with each other. In other words, the poorly heat-conductive pipe 2A prevents the coolant from flowing from the inside of it to the outside or from the outside of it to the inside.

The heat-insulated pipe 15 placed at the outer side of the cable cores 10 is a corrugated SUS pipe. It has a dual-pipe structure composed of an outer pipe 15a and an inner pipe 15b, between which a heat-insulating material (not shown) is placed in multiple layers. The space between the outer pipe 15a and the inner pipe 15b is evacuated to a high vacuum degree. Thus, the pipe 15 has an evacuated multilayer heat-insulated structure. Consequently, unlike the above-described poorly heat-conductive pipe 2A, the heat-insulated pipe 15 practically does not permit the heat conduction to the outside of it or from the outside of the pipe 15. Of the heat-insulated pipe 15, the inner pipe 15b produces a space enclosed by the inner circumferential surface of the inner pipe 15b and the outer circumferential surfaces of the three cable cores 10. The insulation-use coolant 12 fills the foregoing space and various gaps in the region at the outside of the poorly heat-conductive pipe 2A in the cable cores 10 not only to perform electric insulation of the superconducting conductor 1 but also to cool the outer superconducting layer 5. In this example, liquid nitrogen (operating temperature: about 77 K) is used as the insulation-use coolant 12. An anticorrosion covering 16 is provided on the heat-insulated pipe 15.

The superconducting cable of the present invention having the above-described structure uses different coolants for the cooling of the superconducting conductor and for the electric insulation of the superconducting conductor. In particular, the coolant for the cooling of the superconducting conductor (conductor-use coolant) is a coolant having a temperature lower than that of the insulation-use coolant. Consequently, when the quantity of the superconducting material forming the superconducting conductor is the same, the transmission power can be increased. Alternatively, when the transmission power is the same, the quantity of the superconducting material used for forming the superconducting conductor can be decreased, decreasing the diameter of the superconducting conductor. In addition, the quantity of the superconducting material used for forming the outer superconducting layer can also be decreased. As a result, a sufficient conductor-use coolant can be circulated in the poorly heat-conductive pipe, and therefore the superconducting state of the superconducting conductor can be maintained in better condition. Furthermore, the insulation-use coolant can perform sufficient electric insulation of the superconducting conductor. In addition, a shielding current can flow reliably in the outer superconducting layer, thereby enabling the prevention of the electromagnetic interference.

In a superconducting cable of the present invention, the conductor-use coolant has a temperature lower than that of the insulation-use coolant, and the poorly heat-conductive pipe permits the heat intrusion from the outside of the pipe to a certain extent. Consequently, the conductor-use coolant can cool the insulation-use coolant. Therefore, the conductor-use coolant can be used to control the temperature of the insulation-use coolant. In this example, the degree of the cooling of the insulation-use coolant by the conductor-use coolant can be varied by varying the thickness of the poorly heat-conductive pipe. In the case where the conductor-use coolant is circulated, the foregoing degree of the cooling can also be varied by varying the flow rate, circulating time duration, and so on of the conductor-use coolant. For example, by repeating the circulation and noncirculation of the conductor-use coolant, the temperature control of the insulation-use coolant can be carried out. In this case, when the insulation-use coolant is maintained at a temperature that can sufficiently maintain the superconducting state of the outer superconducting layer, it is not necessary to circulate the insulation-use coolant. Therefore, not only can the need for the circulating pump for the insulation-use coolant be eliminated but also the necessity for electric power needed for the pump can be eliminated. In addition, the temperature control of the insulation-use coolant can also be carried out by combining a circulating time period in which the circulating flow rate of the conductor-use coolant is high and another circulating time period in which the circulating flow rate is low. As described above, the use of the conductor-use coolant for the cooling of the insulation-use coolant can reduce or simplify the cooling apparatus, circulating apparatus, and so on needed for cooling the insulation-use coolant. Moreover, in the case where a superconducting cable of the present invention is used for the means of supplying electric power in a hydrogen plant or hydrogen station, when the liquid nitrogen stored in the plant or the like is used as the conductor-use coolant and furthermore the apparatus of the plant or the like is used as the cooling apparatus for the conductor-use coolant, the necessity for the separate providing of the cooling apparatus for the conductor-use coolant can be eliminated, and consequently the scale of the apparatus can be reduced. Even when part of the insulation-use coolant solidifies resulting from the cooling by the conductor-use coolant, in the case where the electrically insulating layer has an electrically insulating strength needed for the electric insulation, the solidification of the insulation-use coolant is permitted.

In addition, in a superconducting cable of the present invention, even when a high current flows in the superconducting conductor due to a short-circuiting accident or the like, the superconducting conductor can be speedily cooled to a specified temperature by further reducing the temperature of the conductor-use coolant or by increasing the flow rate of it. Thus, the disruption of the superconducting conductor resulting from the above-described accident can be prevented. These effects are also applied to the below-described Examples 2 to 4.

Such a superconducting cable of the present invention can be used for both DC transmission and AC transmission. For performing DC transmission, when the electrically insulating layer 4 is structured with the $\rho$ grading such that as the radial position moves toward the innermost portion of the electrically insulating layer 4, the resistivity decreases, and as the radial position moves toward the outermost portion, the resistivity increases, the distribution of the DC electric field can be flattened thicknesswise in the electrically insulating layer 4. The resistivity can be varied by using different groups of PPLP (registered trademark), the different groups each having a different ratio, k. As the ratio, k, increases, the resistivity tends to increase. In addition, when the electrically insulating layer 4 is provided with a high $\in$ layer in the vicinity of the superconducting conductor 1, its impulse voltage-withstanding property can be improved in addition to the improvement in the DC voltage-withstanding property. The high $\in$ layer can be formed by using PPLP (registered trademark) having a low ratio, k, for example. In this case, the high $\in$ layer becomes to be a low $\rho$ layer also. Furthermore, in addition to the above-described $\rho$ grading, when the electrically insulating layer 4 is formed such that as the radial position moves toward the innermost portion, the dielectric constant, $\in$, increases, and as the radial position moves toward the outermost portion, the dielectric constant, $\in$, decreases, the electrically insulating layer 4 also has excellent AC property. Therefore, the above-described superconducting cable can also be suitably used for AC transmission. For example, by using different groups of PPLP (registered trademark), the different groups each having a different ratios, k, as follows, an electrically insulating layer can be formed that has three different steps of resistivity and dielectric constant. It is recommended that the following three layers be provided in the following order from inside (X and Y each represent a constant):

A low $\rho$ layer: ratio (k): 60%, resistivity ($\rho$) (at 20° C.): X $\Omega\cdot$cm, dielectric constant ($\in$): Y;

A middle $\rho$ layer: ratio (k): 70%, resistivity ($\rho$) (at 20° C.): about 1.2X $\Omega\cdot$cm, dielectric constant ($\in$) about 0.95Y; and A high $\rho$ layer: ratio (k): 80%, resistivity ($\rho$) (at 20° C.): about 1.4X $\Omega\cdot$cm, dielectric constant ($\in$) about 0.9Y.

When the above-described superconducting cable is used for performing unipolar transmission, of the three cores 10, two cores may be used as spare cores. In this case, the remaining one core 10 is used as follows: Its superconducting conductor 1 is used as the outward conductor, and its outer superconducting layer 5 as the return conductor. Alternatively, three circuits of unipolar transmission lines may be constructed by using the superconducting conductors 10 of the individual cores 10 as the outward conductors and the outer superconducting layers 5 of the individual cores 10 as the return conductors. When the above-described superconducting cable is used for performing bipolar transmission, it is recommendable to use it as follows: Of the three cores 10, one core 10 is used as a spare core. The superconducting conductor 1 of another core 10 is used as the positive-pole line. The superconducting conductor 1 of the remaining core 10 is used as the negative-pole line. The outer superconducting layers 5 of the two cores 10 are used as the neutral-line layers. In addition, the superconducting cable can be used for performing DC transmission, such as unipolar transmission and bipolar transmission, after being used for performing the above-described AC transmission. As described above, a superconducting cable of the present invention having an electrically insulating layer structured by the $\rho$ grading and $\in$ grading can be suitably used as a DC/AC cable. The matter concerning the $\rho$ grading and $\in$ grading is also applied to the below-described Example 2 to 4.

Example 2

Figure 2:
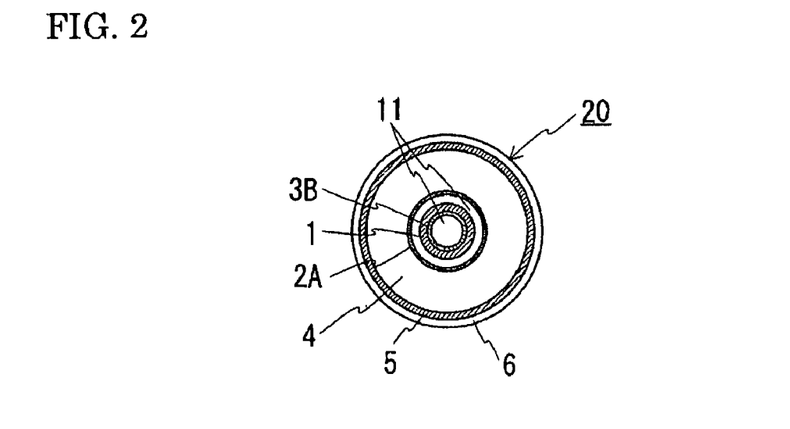
FIG. 2 is a schematic cross-sectional view of a cable core provided in a superconducting cable of the present invention, the view showing an example in which the former is a hollow body.

In Example 1 described above, the structure using a solid former is explained. Nevertheless, a hollow former may be employed. FIG. 2 shows a schematic cross-sectional view of a cable core in a superconducting cable of the present invention. A cable core 20 shown in FIG. 2 has the same structure as that of the cable core 10 shown in Example 1 described above, except that a former 3B is a hollow body. A heat-insulated pipe and anticorrosion covering (both are not shown) are provided at the outer side of the core 20. The former 3B used in this example is a copper tube. A conductor-use coolant 11 is circulated in the former 3B. In this case, in a poorly heat-conductive pipe 2A, the clearance formed by the inner circumferential surface of the pipe 2A and the outer circumferential surface of the superconducting conductor 1 may either be used to circulate the conductor-use coolant 11 or be evacuated to a low vacuum degree. Because of the low vacuum degree, the heat intrusion from the outside of the poorly heat-conductive pipe 2A to the inside of it can be permitted to a certain extent. Consequently, the insulation-use coolant can be cooled by the conductor-use coolant 11.

Example 3

Figure 3:
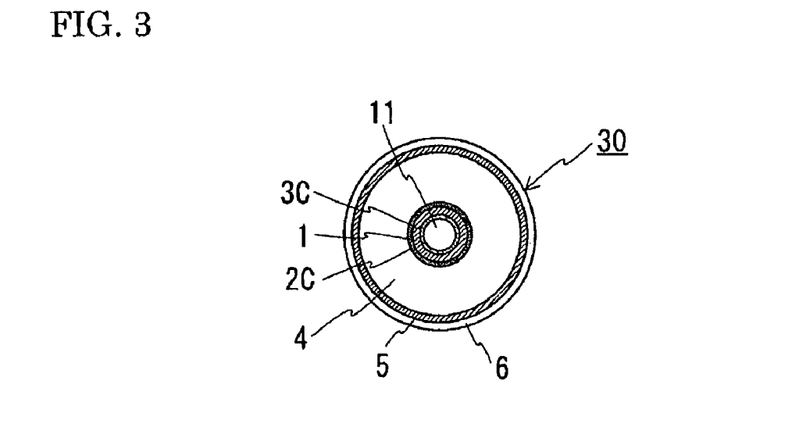
FIG. 3 is a schematic cross-sectional view of a cable core provided in a superconducting cable of the present invention, the view showing an example in which the poorly heat-conductive pipe is formed by extrusion.

Example 2 described above has a structure in which in the poorly heat-conductive pipe, a clearance is provided between the inner circumferential surface of the pipe and the outer circumferential surface of the superconducting conductor. Nevertheless, the poorly heat-conductive pipe may be provided without forming the clearance. In other words, the pipe may be provided so as to make contact with the superconducting conductor. FIG. 3 shows a schematic cross-sectional view of a cable core in a superconducting cable of the present invention. A cable core 30 shown in FIG. 3 has nearly the same structure as that of the cable core 20 shown in Example 2 described above, except that a poorly heat-conductive pipe 2C is provided directly on the superconducting conductor 1. A heat-insulated pipe and anticorrosion covering (both are not shown) are provided at the outer side of the core 30. In this example, a poorly heat-conductive pipe 2c is formed by extruding Teflon (registered trademark) on a superconducting conductor 1. As described above, when the poorly heat-conductive pipe 2c is formed directly on the superconducting conductor 1, as with the former 3B in Example 2 (see FIG. 2), a former 3C is formed using a hollow body. A conductor-use coolant 11 is circulated in the former 3C to cool the superconducting conductor 1. As with Examples 1 and 2, because the poorly heat-conductive pipe 2C is formed by using a resin having a heat-conducting ability to a certain extent, the insulation-use coolant can be cooled by the conductor-use coolant 11 in the former 3C.

Example 4

Figure 4:
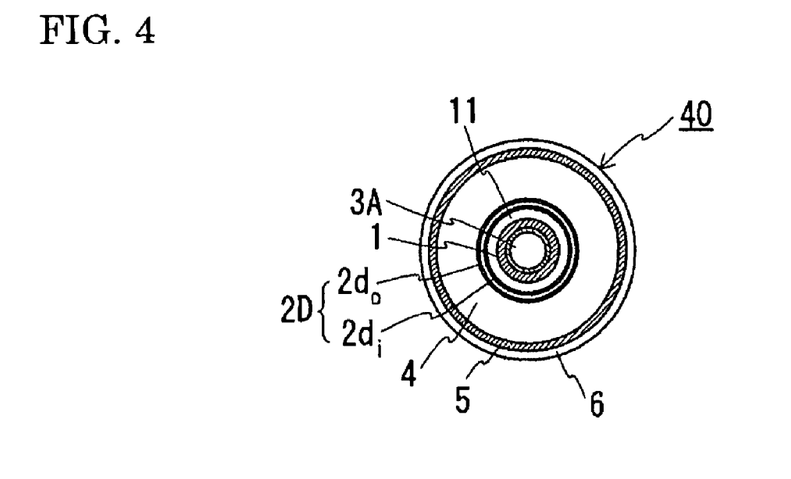
FIG. 4 is a schematic cross-sectional view of a cable core provided in a superconducting cable of the present invention, the view showing an example in which the poorly heat-conductive pipe has a dual-pipe structure.

In Examples 1 to 3 described above, a poorly heat-conductive pipe made of resin or the like is used. Nevertheless, a poorly heat-conductive pipe provided with a heat-insulating structure having a low heat-insulating performance may be used. FIG. 4 shows a schematic cross-sectional view of a cable core in a superconducting cable of the present invention. A cable core 40 shown in FIG. 4 has the same structure as that of the cable core 10 shown in Example 1 described above, except that a poorly heat-conductive pipe 2D has a low heat-insulating structure. A heat-insulated pipe and anticorrosion covering (both are not shown) are provided at the outer side of the core 40. As with the heat-insulated pipe 15 shown in FIG. 1, the poorly heat-conductive pipe 2D used in this example has a dual-pipe structure composed of an inner pipe $2D_i$ and an outer pipe $2D_o$. The space between the two pipes $2D_i$ and $2D_o$ is evacuated to a low vacuum degree to have a low heat-insulating performance. Consequently, the heat conduction from the outside of the poorly heat-conductive pipe 2D is permitted to a certain extent. As a result, the insulation-use coolant filling various gaps in the region at the outside of the poorly heat-conductive pipe 2D in the cable cores 40 and the space at the outer side of the core 40 (see FIG. 1) can be cooled by the conductor-use coolant 11 circulating in the inner pipe $2D_i$. As described above, the heat-conducting ability of the poorly heat-conductive pipe can be controlled not only by controlling the thermal conductivity of the material itself for forming the poorly heat-conductive pipe or the thickness of the pipe as shown in Examples 1 to 3 but also by controlling the heat-insulating performance of the pipe as shown in this example. In this example, as with Example 1, a solid former is used. Nevertheless, as with Examples 2 and 3, a hollow former may be used, of course.

INDUSTRIAL APPLICABILITY

A superconducting cable of the present invention is suitably used as a means for supplying electric power to various power apparatuses and consumers. In particular, in the case where liquid hydrogen, a low-temperature hydrogen gas, or a mixed fluid of liquid hydrogen and hydrogen gas is used as the conductor-use coolant, when a cable of the present invention is used to supply electric power to a place, such as a hydrogen plant or hydrogen station that stores liquid hydrogen or the like, the cable system becomes economically excellent, because not only is the conductor-use coolant easily available but also it is not necessary to separately provide the cooling apparatus for the conductor-use coolant and another apparatus.

The invention claimed is:
1. A superconducting cable, comprising:
    (a) a heat-insulated pipe;
    (b) a cable core that is housed in the heat-insulated pipe and the cable core comprises:
        (b1) a superconducting conductor made of a superconducting material;
        (b2) a poorly heat-conductive pipe placed at the outer side of the outer circumference of the superconducting conductor:
        (b3) an electrically insulating layer placed on the outer circumference of the poorly heat-conductive pipe; and
        (b4) an outer superconducting layer that is placed on the outer circumference of the electrically insulating layer and the outer superconducting layer is made of a superconducting material;
    (c) a conductor-use coolant that is circulated in the poorly heat-conductive pipe to cool the superconducting conductor to make it achieve a superconducting state;
    (d) an insulation-use coolant that fills the heat-insulated pipe to perform electric insulation of the superconducting conductor;
    wherein the electrically insulating layer has a $\rho$ (resistivity) grading along a radial direction such that the resistivity of the electrically insulating layer decreases in the radial direction toward an innermost portion of the electrically insulating layer, and the resistivity of the electrically insulating layer increases in the radial direction toward an outermost portion of the electrically insulating layer;
    wherein the electrically insulating layer with $\rho$ (resistivity) grading reduces a radial distribution of a direct current electric field in the electrically insulating layer;
    wherein the electrically insulating layer includes portions that include, in the vicinity of the superconducting conductor, a high dielectric constant layer that has a dielectric constant $\in$ higher than the dielectric constant of other portions of the electrically insulating layer; and
    wherein the electrically insulating layer is formed such that the dielectric constant $\in$ increases toward the innermost portion of the electrically insulating layer, and the dielectric constant $\in$, decreases toward the outermost portion of the electrically insulating layer.

2. A superconducting cable as defined by claim 1, wherein the conductor-use coolant has a temperature lower than that of the insulation-use coolant.

3. A superconducting cable as defined by claim 1, wherein the insulation-use coolant is liquid nitrogen and the conductor-use coolant is a fluid having a temperature lower than the boiling point of liquid nitrogen.

4. A superconducting cable as defined by claim 3, wherein the conductor-use coolant is any of liquid oxygen, liquid helium, helium gas, liquid hydrogen, hydrogen gas, liquid air, liquid neon, a mixed fluid of liquid hydrogen and hydrogen gas.

5. A method of controlling the temperature of the insulation-use coolant of a superconducting cable as defined by claim 1, the method using the conductor-use coolant to control the temperature of the insulation-use coolant.

6. A method of controlling the temperature of the insulation-use coolant of a superconducting cable, the method being as defined by claim 5, the method using the conductor-use coolant to cool the insulation-use coolant and repeating the circulation and noncirculation of the conductor-use coolant to control the temperature of the insulation-use coolant.

7. A superconducting cable, comprising:
    (a) a heat-insulated pipe;
    (b) a cable core that is housed in the heat-insulated pipe and that comprises:
        (b1) a superconducting conductor made of a superconducting material;

(b2) a poorly heat-conductive pipe placed at the outer side of the outer circumference of the superconducting conductor:
(b3) an electrically insulating layer placed on the outer circumference of the poorly heat-conductive pipe; and
(b4) an outer superconducting layer that is placed on the outer circumference of the electrically insulating layer and that is made of a superconducting material;
(c) a conductor-use coolant that is circulated in the poorly heat-conductive pipe to cool the superconducting conductor to make it achieve a superconducting state; and
(d) an insulation-use coolant that fills the heat-insulated pipe to perform electric insulation of the superconducting conductor,
wherein the electrically insulating layer has resistivity grading such that the resistivity of the electrically insulating layer decreases in a radially inward direction toward the superconducting cable; and
wherein the electrically insulating layer with resistivity grading is formed such that a direct current electric field distribution is reduced in the electrically insulating layer and the electrically insulating layer with resistivity grading has a higher dielectric constant adjacent to the outer superconducting layer than other portions of the electrically insulating layer.

8. The superconducting cable of claim 7, wherein the electrically insulating layer comprises kraft paper of varying densities at different radial lengths of the electrically insulating layer.

9. The superconducting cable of claim 7, wherein the electrically insulating layer comprises insulating paper and plastic film.

10. The superconducting cable of claim 9, wherein the electrically insulating layer achieves resistivity grading by varying the ratio, or thickness of the plastic film compared to the total thickness of the insulating paper at different radial lengths.

11. The superconducting cable of claim 9, wherein the electrically insulating layer achieves resistivity grading by varying at least one of a density, quality, and additive in the insulating paper.

* * * * *